(12) United States Patent
Kimura

(10) Patent No.: US 7,813,269 B2
(45) Date of Patent: Oct. 12, 2010

(54) COMMUNICATION APPARATUS AND ABNORMALITY RESTORATION METHOD

(75) Inventor: Shingo Kimura, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/392,848

(22) Filed: Feb. 25, 2009

(65) Prior Publication Data

US 2009/0285087 A1 Nov. 19, 2009

(30) Foreign Application Priority Data

May 13, 2008 (JP) .............................. 2008-126079

(51) Int. Cl.
 *H04J 1/16* (2006.01)
(52) U.S. Cl. .................. 370/218; 370/216; 370/242
(58) Field of Classification Search ................ 370/218, 370/242, 216, 352
 See application file for complete search history.

(56) References Cited

U.S. PATENT DOCUMENTS

| | | | |
|---|---|---|---|
| 7,007,077 B1 * | 2/2006 | Shinohara et al. ........... | 709/220 |
| 7,333,472 B2 * | 2/2008 | Yang et al. .................. | 370/352 |
| 7,518,984 B2 * | 4/2009 | Koyama ..................... | 370/217 |
| 2006/0200707 A1 * | 9/2006 | Shishido et al. ............. | 714/100 |
| 2007/0055969 A1 * | 3/2007 | Yang .......................... | 717/168 |
| 2008/0109798 A1 * | 5/2008 | Gavens et al. ............... | 717/168 |
| 2009/0019499 A1 * | 1/2009 | Singhai et al. ................ | 725/92 |
| 2009/0044056 A1 * | 2/2009 | Itoh ............................ | 714/31 |

FOREIGN PATENT DOCUMENTS

| | | |
|---|---|---|
| JP | 2003-067194 | 3/2003 |
| JP | 2004-78849 | 3/2004 |
| JP | 2004-334307 | 11/2004 |
| JP | 2005-135212 | 5/2005 |
| JP | 2006-92194 | 4/2006 |
| JP | 2007-141076 | 6/2007 |
| JP | 2007-318621 | 6/2007 |
| JP | 2007-114883 | 10/2007 |
| JP | 2007-305313 | 11/2007 |
| WO | WO03025742 A2 * | 3/2003 |

OTHER PUBLICATIONS

Japanese patent application No. 2008-137178, Notice of Reason for Rejection, mailed Apr. 14, 2009 (English translation).
Notification of Reasons for Rejection with English translation in a corresponding Japanese application; application No. 2008-126079 dated Apr. 23, 2009.

* cited by examiner

*Primary Examiner*—Ricky Ngo
*Assistant Examiner*—Dewanda Samuel
(74) *Attorney, Agent, or Firm*—Blakely Sokoloff Taylor & Zafman, LLP

(57) ABSTRACT

According to one embodiment, a communication apparatus includes an acquisition module selectively acquires equipment information showing communication equipment including the same program as the program recorded on the first recording medium to record the equipment information in a second recording medium differing from the first recording medium, and a failure restoration module obtains a program from communication equipment based on the equipment information recorded on the second recording medium, and start the communication apparatus based on the obtained program, when the communication apparatus cannot start by the program recorded on the first recording medium.

5 Claims, 6 Drawing Sheets

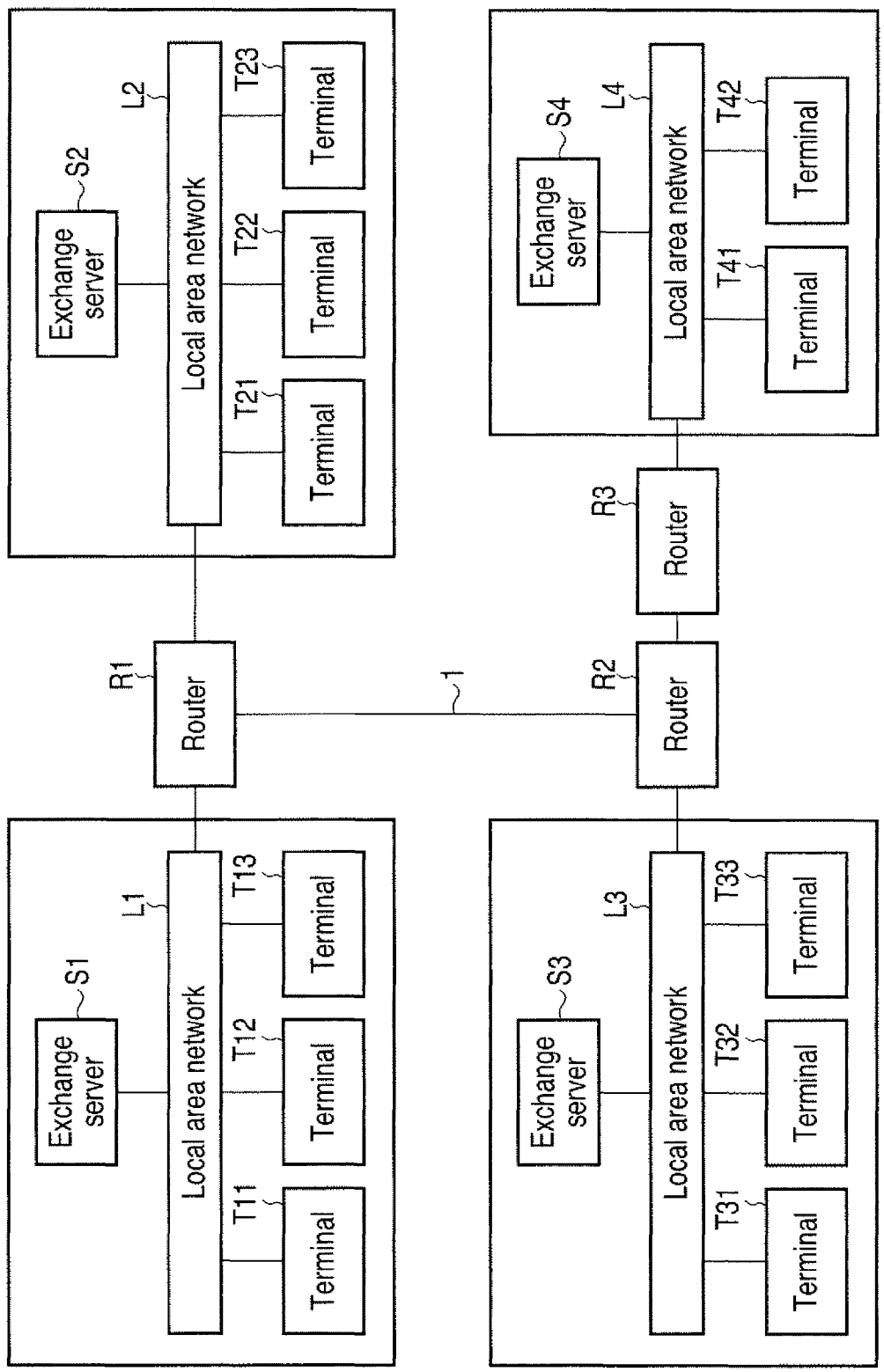
F I G. 1

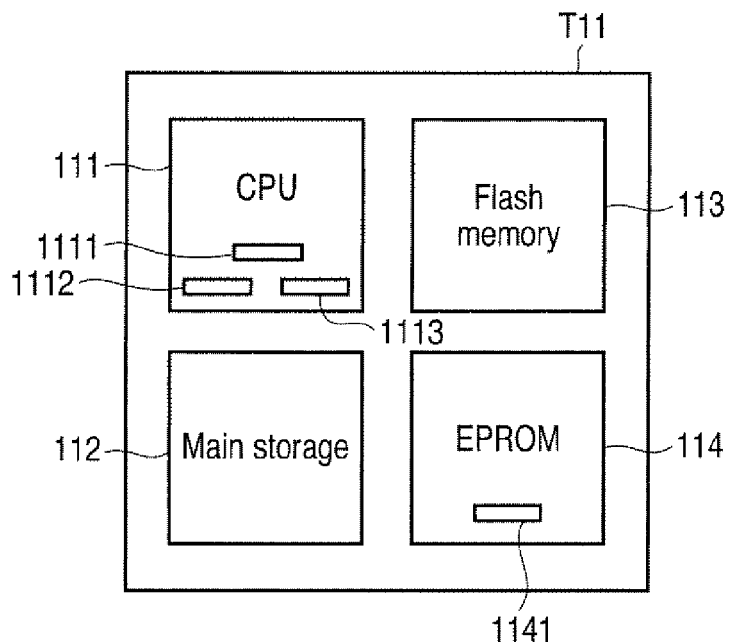
FIG. 2
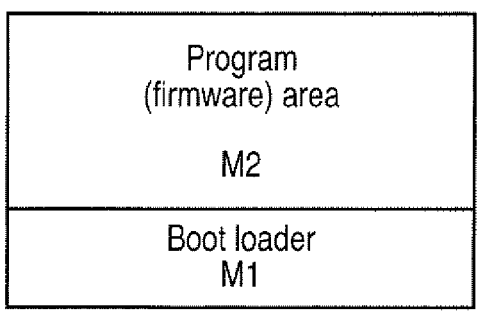
FIG. 3
| Priority | Program acquisition destination address | Metrics |
|---|---|---|
| 1 | A.B.C.D | 0 |
| 2 | E.F.G.H | 1 |
| 3 | W.X.Y.Z | 3 |
FIG. 4

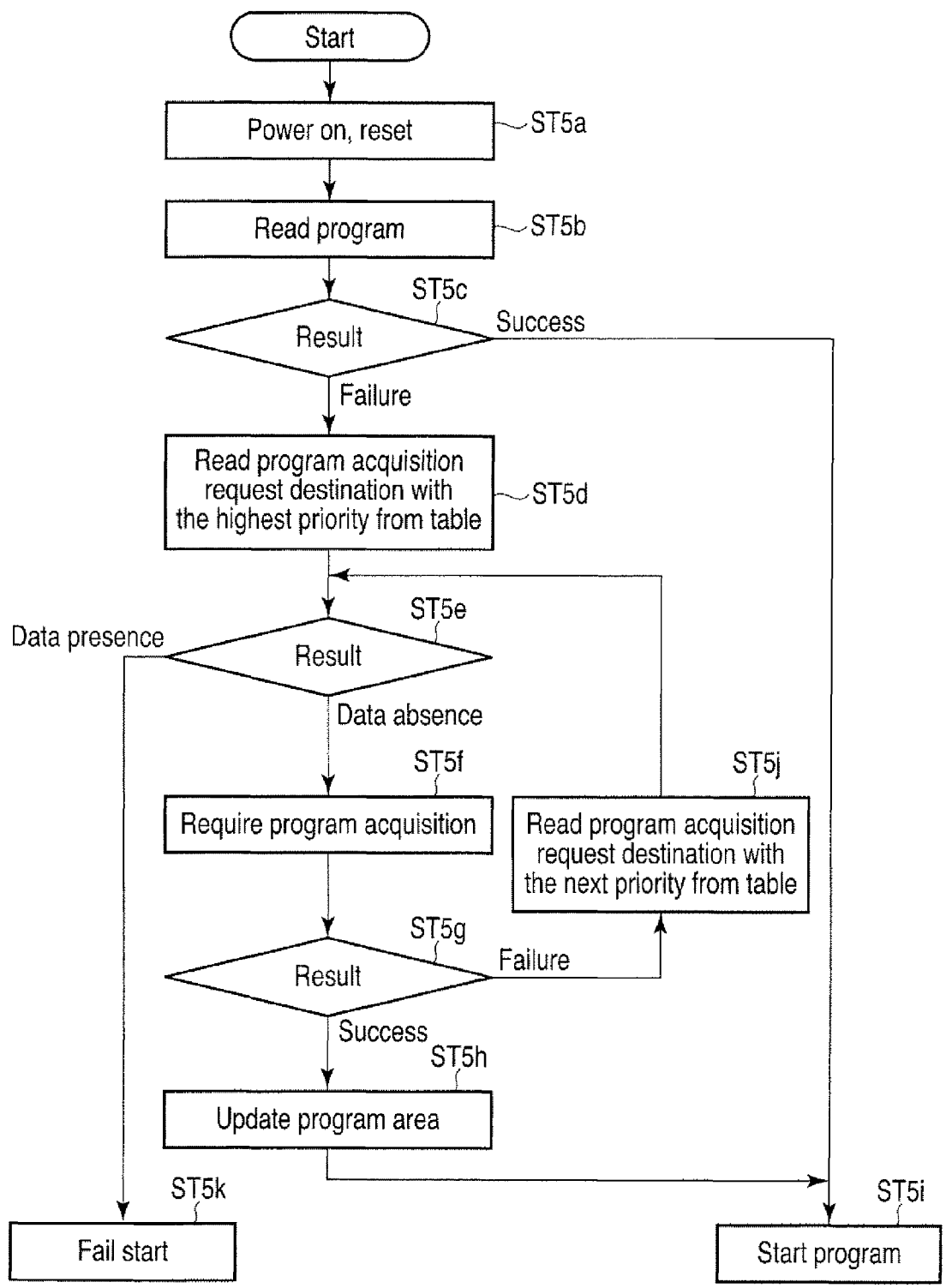
F I G. 5

COMMUNICATION APPARATUS AND ABNORMALITY RESTORATION METHOD

CROSS-REFERENCE TO RELATED APPLICATIONS

This application is based upon and claims the benefit of priority from Japanese Patent Application No. 2008-126079, filed May 13, 2008, the entire contents of which are incorporated herein by reference.

BACKGROUND

1. Field

One embodiment of the present invention relates to a communication apparatus for use in, for example, an Internet Protocol (IP) telephone system, and an abnormality restoration execution method for an operation abnormality which occurs in the communication apparatus.

2. Description of the Related Art

In recent years, the IP telephone system has become widely used. Such an IP telephone system, for example, by performing protocol conversion and format conversion of data in exchange servers on an IP network as well as by connecting IP telephone terminals to the IP network including, for example, local area network (LAN) enables voice communications of inter-IP telephone terminals and among IP telephone terminals and a general telephone network.

Meanwhile occurrences of abnormalities in programs are sufficiently anticipated from the exchange servers and the IP telephone terminals. In this case, maintenance persons perform restoration work such as rewriting abnormal programs into normal programs, and then this work causes increases in costs other in addition to changes in program.

Conventionally, a technique, which diagnoses states of client modules of storage modules when power is supplied, and requires servers to download the client modules when abnormalities are recognized, is proposed (e.g., Jpn. Pat. Appln. KOKAI Publication No. 2004-78849).

Also in the IP telephone systems, methods for automatically restoring the programs without requiring hand work by the maintenance persons accompanied by the occurrences of abnormalities in the programs of the exchange servers and the IP telephone terminals are strongly desired. However, the methods still have been in examination states, and have not been realized yet in the present circumstances.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary schematic configuration view of an IP multimedia exchange system of a first embodiment of the invention;

FIG. 2 is an exemplary schematic block diagram of a terminal shown in FIG. 1;

FIG. 3 is an exemplary view depicting a memory structure of a flash memory shown in FIG. 2;

FIG. 4 is an exemplary view depicting an example of storage content of a program acquisition destination storage table stored in an erasable programmable read-only memory (EPROM) shown in FIG. 2;

FIG. 5 is an exemplary flowchart depicting a start processing procedure of a terminal in the first embodiment of the invention;

DETAILED DESCRIPTION

Figure 6:
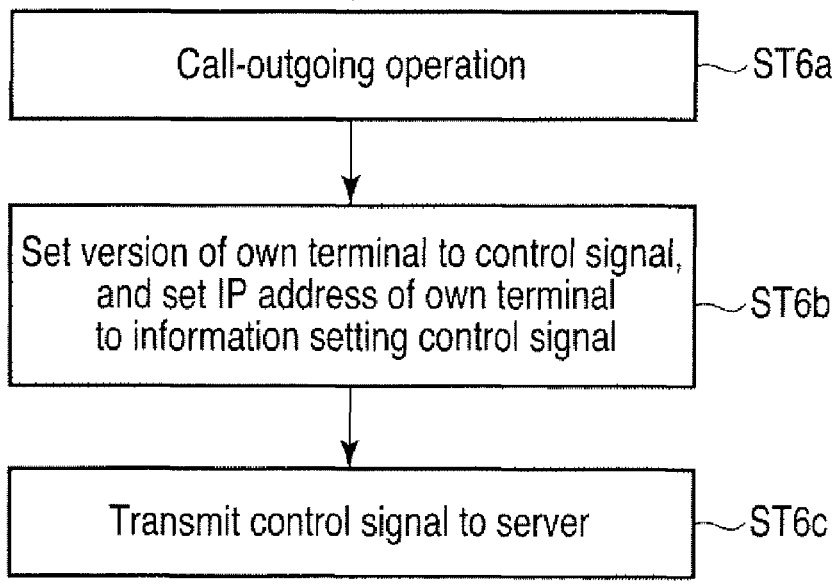
FIG. 6 is an exemplary flowchart depicting an update procedure of a program acquisition destination storage table of a terminal on a call-originating side in the first embodiment of the invention.

Various embodiments according to the invention will be described hereinafter with reference to the accompanying drawings. In general, according to one embodiment of the invention, a communication apparatus which starts based on a program stored in a first recording medium to execute communication processing, comprising: an acquisition module configured to selectively acquire equipment information showing communication equipment including the same program as the program recorded on the first recording medium to record the equipment information in a second recording medium differing from the first recording medium; and a failure restoration module configured to obtain a program from communication equipment based on the equipment information recorded on the second recording medium, and start the communication apparatus based on the obtained program, when the communication apparatus cannot start by the program recorded on the first recording medium.

First Embodiment

FIG. 1 shows a schematic configuration view depicting an IP multimedia exchange system of a first embodiment of the invention.

The exchange system includes a wide area network 1 for transferring a video signal, computer data, etc. Routers R1-R3 are connected to the network 1.

In this exchange system, it is assumed that LANs L1-L4 at four base points are mutually connected through the routers R1-R3, and exchange servers S1-S4 and terminals T11-T13, T21-23, T31-T33 and T41-T42 are arranged at each of the four base points. Here, for example, IP-PBXs, etc., are used as the exchange servers S1-S4. IP telephone sets, video telephone sets, etc., treating multimedia, such as audio and video, are used as the terminals T11-T13, T21-T23, T31-T33 and T41-T42.

The exchange server S1 includes an exchange control function among the terminals T11-T13 on the LAN L1 or among the terminals T11-T13 and the network 1. The exchange servers S2-S4 are also include exchange control functions for the terminals T21-T23, T31-T33 and T41-T42, respectively, in the same way for the exchange server S1.

FIG. 2 shows schematic block views of the terminals T11-T13, T21-T23, T31-T33 and T41-T42. Here, the terminal T11 will be described as a representative.

The terminal T11 includes a CPU 111, a main storage module 112, a flash memory 113 and an EPROM 114. The EPROM 114 may be replaced by a part of the area of the flash memory 113. The flash memory 113 is used mainly for storing a program (firmware), and a boot loader for starting the program is stored in the flash memory 113 independently.

FIG. 3 shows a memory structure of a general flash memory 113. A boot loader M1 is written only one time when being shipped from a factory, and it is not rewritten during operation. Meanwhile, the program (firmware) module M2 may be rewritten during operation due to addition of a function or correction of a defect.

A program acquisition destination table 1141 (referred to as a table 1141) for emergency is stored in the EPROM 114 as shown in FIG. 4. IP addresses of equipment to be acquisition destinations of programs are stored in order of priority when the start of the program is failed. In the first embodiment, while the addresses from the first priority up to the third priority are stored, the number if addresses may be set arbitrarily. In this way, having a plurality of candidates enables enhancing the possibility of relief when the start of the program is failed. Metrics information for deciding the priority is stored in the table 1141. In the embodiment, the number of router stages between the exchange server and the equipment to be the program acquisition destination candidates is used as the metrics. Here, a value "0" indicates that both the exchange server and the equipment belong to the same LAN (IP subnet), and that any of the routers R1-R3 does not exist between the server and the equipment to be candidates.

In a normal operation mode, the CPU 111 applies overall control to each module of the corresponding-terminal T11 based on the program stored in the flash memory 113 to achieve operations as the terminal T11. In a program rewriting mode, the CPU 111 rewrites the program based on the boot loader stored in the flash memory 113.

The CPU 111 is provided with an equipment information acquisition module 1111 (referred to as an acquisition module 1111), a failure treatment module 1112, and a candidate selection module 1113. Upon call-outgoing and call-incoming, the acquisition module 1111 acquires equipment information included in control information from the terminal T21 to be a communication partner, determines whether or not the program versions of the terminal T11 and the terminal T21 are equal to each other from the acquired equipment information, and if the program versions are equal to each other, records the equipment information in the table 1141 on the EPROM 114.

When being impossible to start by the program stored in the flash memory 113, the failure treatment module 1112 acquires the program from the corresponding-terminal T21 based on the storage table 1141 recorded on the EPROM 114 to start the treatment module 1112 based on the program.

The candidate selection module 1113 rearranges selection order of the program acquisition destination candidates of the storage table 1141 on the EPROM 114 based on the number of the routers R1-R3 though which the selection module 1113 passes in communication.

The following will describe operations in the above configuration.

FIG. 5 shows a flowchart depicting the start processing procedure of the terminal T11. When the terminal T11 is powered on or reset (Block ST5$a$), the CPU 111 starts the boot loader, reads an application program from a program storage area of the flash memory 113, and performs work to shift the processing from the boot loader to the application program (Block ST5$b$).

If any abnormality occurs (Failure, Block ST5$c$), the CPU 111 shifts from Block ST5$c$ to Block ST5$d$, and there, the boot loader accesses the table 1141 of the EPROM 114 to read the address of the program acquisition destination candidate having the highest priority.

If data can be acquired (data presence, Block ST5$e$), the CPU 111 shifts from Block ST5$e$ to Block ST5$f$, and there, issues a program acquisition request for its own version to the address. As regards an acquisition method, Trivial File Transfer Protocol (TFTP) is generally used. If the program acquisition request results in success (Success, Block ST5$g$), the CPU 111 shifts from Block ST5$g$ to Block ST5$h$, and there, writes the program in the program area to continue start processing (Block ST5$i$).

Conversely, if the terminal T11 fails to acquire the program in Block ST5$g$, the CPU 111 reads the acquisition destination candidate of the next priority from the table 1141 (Block ST5$j$), and makes an acquisition request to the candidate. This processing is repeated until the terminal T11 successes to acquire the program, or until the terminal T11 fails to achieve the requests for all the candidates registered in the table 1141.

In Block ST5$c$, if any abnormality occurs, the CPU 111 sifts to Block ST5$i$ as it is, further, if the data does not exist in the table 1141 in Block ST5$e$, the terminal T11 results in start failure to terminate the processing as it is (Block ST5$k$).

Figure 7:
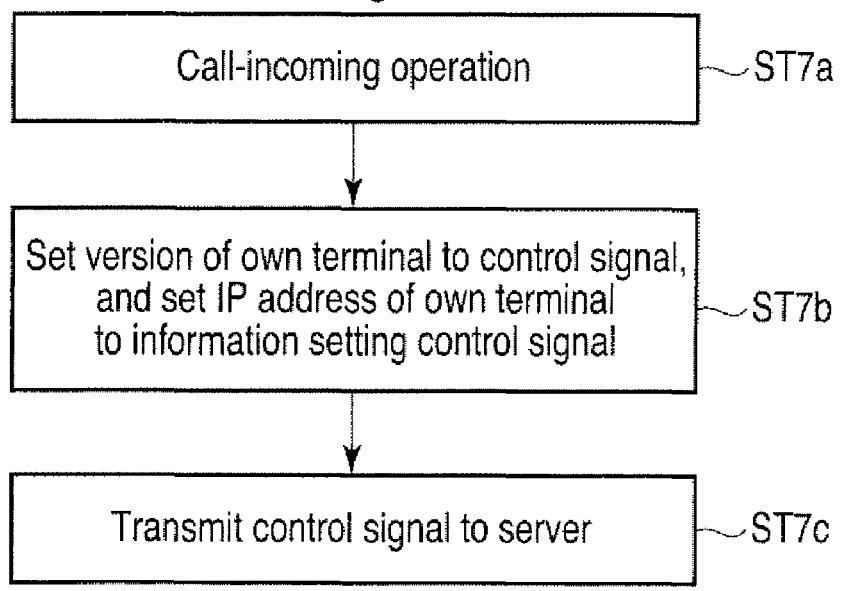
FIG. 7 is an exemplary flowchart depicting an update procedure of a program acquisition destination storage table of a terminal on a call-incoming side in the first embodiment of the invention.

FIGS. 6, 7 are flowcharts when the terminals T11, T31 update the table 1141, respectively.

The terminal T11 to be the call-originating side sets a program version of its own terminal to a control signal in a call-originating operation to transmit a control packet to the exchange server S1 (Blocks ST6$a$-ST6$c$).

Meanwhile, the terminal T31 to be a response (call-incoming) side, similarly sets its own program version to a response signal in response (call-incoming) operation to transmit a control packet to the exchange server S1 (Blocks ST7$a$-ST7$c$). As one example of achievement, IP telephone mutual communications by means of Session Initiation Protocol (SIP) are taken into consideration. The terminal T11 on the call-originating side transmits a SIP Invite message; however, the terminal T11 makes a text field of Session Description Protocol (SDP) included in the Invite message include the program version. Similarly, the response terminal T31 may include the program version in the text field of SDP included an OK message.

Figure 8:
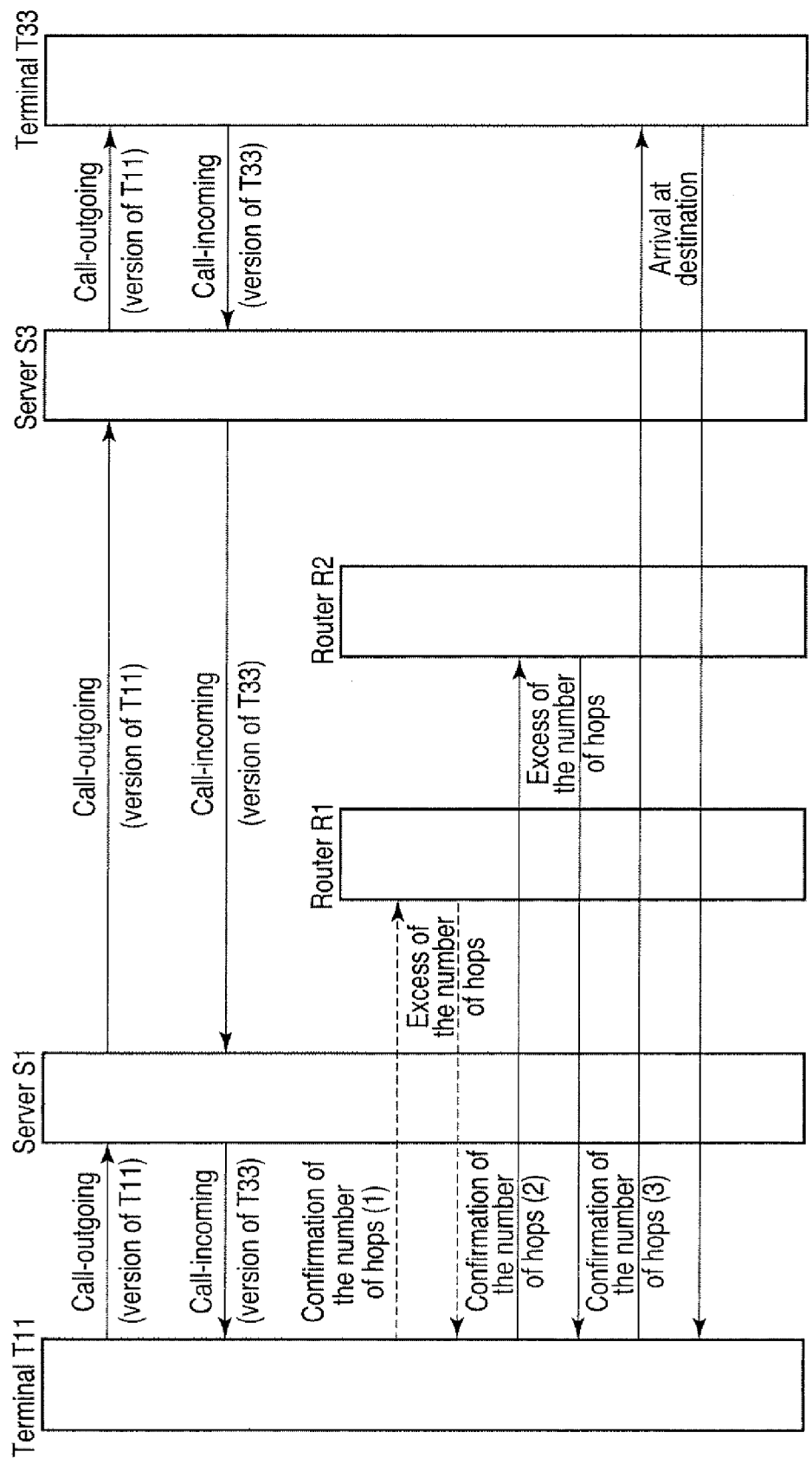
FIG. 8 is an exemplary sequence view depicting operations registering program acquisition destination candidates in the program acquisition destination storage table during communication among terminals in the first embodiment of the invention.

FIG. 8 shows a sequence view depicting operations to register the program acquisition destination candidate in the table 1141 during communication between the terminals T11 and T33.

It is assumed that the terminal T11 makes an outgoing call to the terminal T13 to perform mutual communications. The number of stages of the routers from the terminal T11 to the terminal T33 is equivalent to two, so that the terminal T11 obtains "2" as the metrics to the terminal T33. Since the metrics to the candidate for the priority three is "3", the terminal T11 registers (rewrites) the IP address of the terminal T33 as a candidate for the priority three in the table 1141 together with the metrics.

In this way, in the first embodiment, the terminal T11 acquires equipment information by using the control signal which can be obtained in call-originating or call-incoming to record the equipment information in the table 1141, and when the terminal T11 cannot start due to the abnormality in program, the terminal T11 obtains a program from another terminal T22 based on the table 1141 on the EPROM 114 to start itself.

Therefore, since it is not necessary to have a backup area for the program, a cost of equipment may be reduced, thereby, when an abnormality occurs in program, the terminal T11 may effectively cope with the abnormality in program at a low cost. Since it is not necessary to set a server for storing the program on the network in advance, a management const is reduced.

In the first embodiment, since many program acquisition destination candidates may be registered in the table 1141, it makes it possible to select many program acquisition destinations in an occurrence of an abnormality in program, thus, the reliability of the connection to the program acquisition destination may improved.

Second Embodiment

Figure 9:
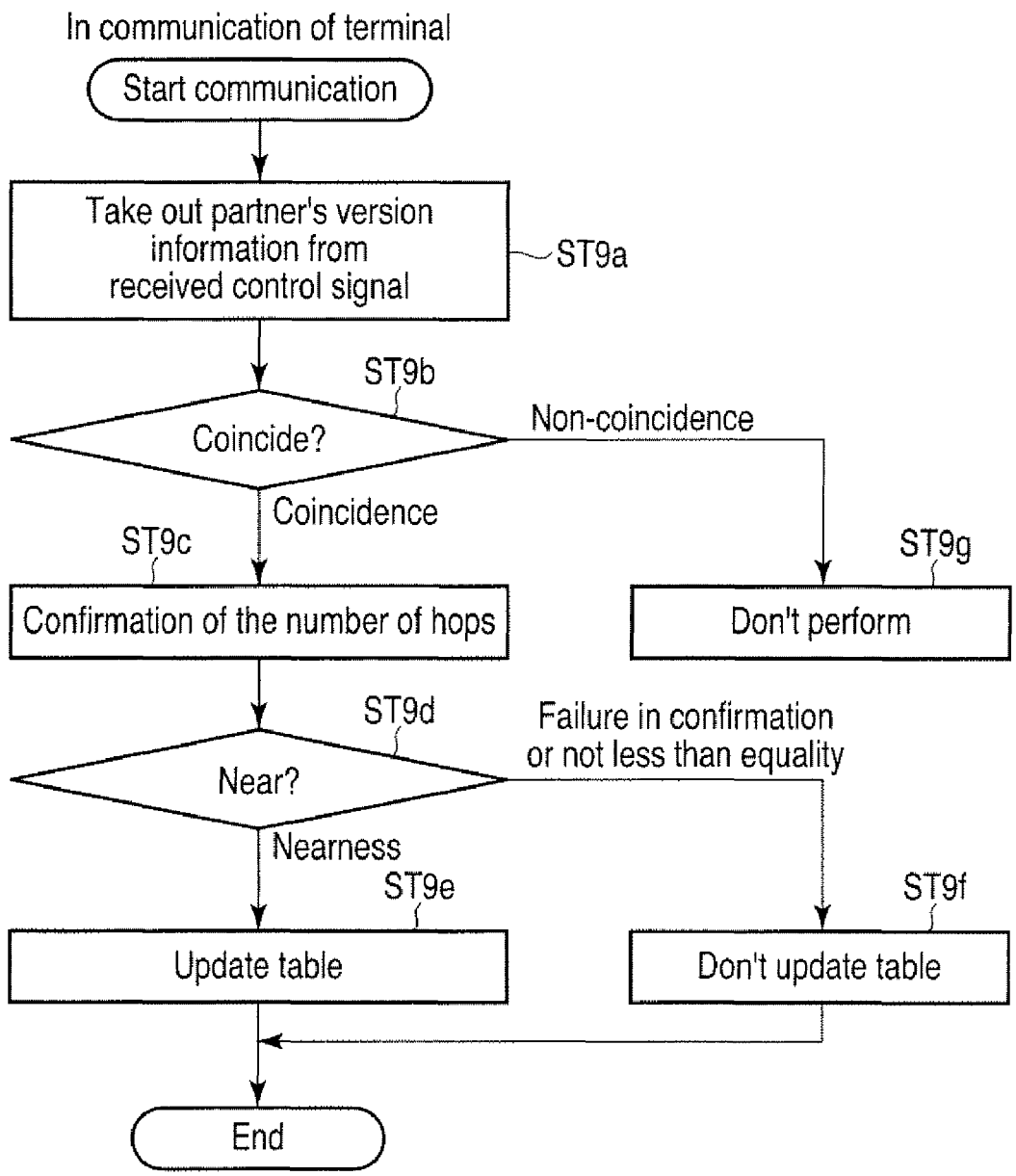
FIG. 9 is an exemplary flowchart depicting a procedure updating the program acquisition destination storage table when communications are made among terminals as a second embodiment of the invention.

FIG. 9 shows a flowchart as a second embodiment of the invention, which depicts a flowchart in update of the table 1141 during telephone call between the terminals T11 and T31.

After the telephone call, both the terminals T11 and T31 on the call-originating side and call-incoming side take out the version information of partner's terminals from the control packets which have received from the partners (Block ST9a), and compares if the version information coincides with the version of its own terminal (Block ST9b).

If the versions of both the terminals T11, T31 coincide with each other, the partner's terminal may become the program acquisition destination candidate when the call partner's terminal has failed in a start. In this embodiment, further the IP multimedia exchange system of the invention estimates the nearness in relation to the network to and from the partner's terminal to measure the number of router hops so as to set a terminal which is closer as a candidate terminal (Block ST9c). Thereby, it becomes able to stably acquire the program. To measure the number of hops, Internet Control Message Protocol (ICMP) is used. Like a well known Trace-route command, repetition of increases until the number of stages of routers finally reaches the partner's terminal measures the number of the stages of the routers between both the terminals while increasing upper limit numbers one by one. If the metrics (the number of stages of routers) obtained herein is smaller than the number which has already been registered in the table, in the processing in the flowchart shifts from Block ST9d to Block ST9e, and there, the table 1141 is rewritten in accordance with the priority corresponding to the number of stages.

Conversely, if the obtained metrics is equal to or larger than the number of the candidates which has already been registered the table 1141 is not updated (Block ST9f).

In Block ST9b, if the obtained metrics does not coincide with the version of its own terminal, the terminals T11, T31 do not perform any processing (Block ST9g).

As mentioned above, in the second embodiment, since the terminal T11 rewrites selection order of the program acquisition destination candidates of the table 1141 on the EPROM 114 in ascending order of the number of routers R1-R3 that are passed through at the time of communications, and the program acquisition destinations are selected in order of nearness from its own terminal T11. Thus, it is not necessary for the terminal T11 to occupy the wide area network 1 for obtaining the program, and it makes it possible to safely acquire the program without leaking out the program to a third party or without being altered.

In the second embodiment, during communication, the terminals T11, T31 determines whether or not the program versions of the communication partners are the same as those recorded in the flash memory 113, and only if both the program versions are the same as those of the program, the system automatically registers the communication partners as the program acquisition destination candidates in the table 1141 of the EPROM 114, so that the system may acquire a appropriate program for each communication partner.

Other Embodiment

The invention is not limited to each of the foregoing embodiments. While the first and second embodiments have been described so as to rewrite the selection order of the program acquisition destination candidates based on the number of the routers that are passed through during communication, the invention is not limited to the embodiments, for example, the IP multimedia exchange system may use information showing the nearness to the network such as a round-trip delay time to the communication partner.

While the first embodiment has been described the example to acquire the version information, etc., from the communication partner in call-outgoing or call-incoming, the system may acquire the version information from the communication partner, for example, during time period in which the communication partner does not operate frequently in normal operation. Other than the time of communications, for example, when a multi-purpose computer or portable medium is connected, the system may acquire the version information of each terminal which has been registered in the computer or the media.

In addition, in terms of a functional configuration or a kind of the exchange server and multimedia terminal, an acquisition procedure of the program information, etc., various modifications may be made without departing from the substance of the invention.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication apparatus which starts based on a program stored in a first recording medium to execute communication processing, comprising:
    an acquisition module configured to selectively acquire equipment information showing communication equipment including the same program as the program recorded on the first recording medium to record the equipment information in a second recording medium differing from the first recording medium from a communication partner, in communicating with the communication partner; and
    a failure restoration module configured to obtain a program from communication equipment based on the equipment information recorded on the second recording medium, and start the communication apparatus based on the obtained program, when the communication apparatus cannot start by the program recorded on the first recording medium, wherein the acquisition module determines whether or not a program version of the communication partner is the same as a program recorded in the first recording medium based on the equipment information acquired from the communication partner, and automatically records the equipment information of the communication partner as a program acquisition destination candidate on the second recording medium, when the program versions are equal to each other.

2. The apparatus of claim 1, wherein the acquisition module records equipment information of a plurality of candidates of which the program versions are equal to the programs recorded on the first recording medium on the second recording medium.

3. The apparatus of claim 2 further comprises a candidate selection module which rearranges selection order of equipment information of a plurality of candidates on the second recording medium in accordance with a prescribed condition.

4. The apparatus of claim 3, wherein the candidate selection module uses either the number of routers passed though or the round-trip delay times to the communication partners and rearranges the equipment information of the plurality candidates on the second recording medium in ascending order of the number of the routers or in ascending order of lengths of the round-trip delay times to the communication partners.

5. An abnormality restoration method for use in a communication apparatus which starts based on a program recorded on a first recording medium and executes communication processing, comprising:

selectively acquiring equipment information showing communication equipment including a program equal to the program recorded on the first recording medium to record the equipment information on a second recording medium differing from the first recording medium from a communication partner, in communicating with the communication partner;

obtaining a program from communication equipment based on the equipment information recorded on the second recording medium, when the communication apparatus cannot start by the program recorded on the first recording medium; and starting the communication apparatus based on the obtained program, wherein the acquiring includes determining whether or not a program version of the communication partner is the same as a program recorded in the first recording medium based on the equipment information acquired from the communication partner, and automatically recording the equipment information of the communication partner as a program acquisition destination candidate on the second recording medium, when the program versions are equal to each other.

* * * * *